3,322,628
METHOD OF TREATMENT OF HEADACHES
Helge Lund-Rasmussen, Gentofte, Denmark, assignor to Løvens Kemiske Fabrik, Produktionsaktieselskab, Ballerup, Denmark
No Drawing. Filed June 1, 1964, Ser. No. 371,743
Claims priority, application Great Britain, Jan. 27, 1964, 3,457/64
6 Claims. (Cl. 167—65)

The present invention relates to a pharmaceutical composition for the treatment of migraine and certain forms of headache, to dosage units of the composition, and to methods of treatment for migraine and headaches.

A purpose of the invention is to provide an effective treatment for migraine and certain forms of headache, in both men and women.

A further purpose is to administer from ¼ to 100 mg. daily of 6α-trifluoromethyl-17α-acetoxyprogesterone or another suitable ester to treat migraine and certain other forms of headache.

Further purposes appear in the specification and in the claims.

The invention more particularly concerns a pharmaceutical composition in which a 17-ester of 6α-trifluoromethyl-17α-hydroxyprogesterone, preferably the acetylester, as the active ingredient is mixed with pharmaceutical carriers and auxiliary agents, and a dosage unit of the composition is administered for treatment of migraine and certain forms of headache.

The compounds aforesaid are known substances which may be prepared by methods published previously in the chemical literature. For two particular such methods related to each other, see British patent specification 905,694, especially pp. 1 and 3, with Example 11(a) and (b) on page 3 setting forth a detailed example of one of them and Examples 11(a), 12 and 13 on p. 3 setting forth a detailed example of the other. The British patent specification, including whatever the abstracter considered needful relative to one of the methods in question, has been abstracted in the 1963 Chemical Abstracts, vol. 58, col. 4632b on.

As is well known, slight attacks of migraine are often treated with analgesics, such as phenacetin, or other compounds whose continuous application in the treatment of the disease involves a risk of poisoning. A more specific therapy includes treatment with ergot alkaloids and certain derivatives thereof which have been used with more or less success in more severe cases of migraine. Experience has shown, however, that patients often need progressively larger doses in order to obtain relief, and a very large number of patients complain of secondary effects, especially nausea, even in cases where lower doses are employed, and in critical cases requiring dosage for a long time some serious side effects may occur, such as effects on the circulatory system, the liver or the kidneys.

From a scientific point of view it is an interesting feature of migraine that a considerable relief is obtainable by administration of certain sex hormones, which has been known for the past decades. It has also been known for a long time that women suffering from migraine usually are free from migrainous attacks during pregnancy, possibly owing to a higher progesterone production in this period, and correspondingly a relief has been obtained by patients suffering from migraine when treated with progesterone administered by means of injection.

An actual treatment of migraine patients with progesterone was not, however, initiated, for example because it would be very inappropriate in the ambulatory treatment of migraine to introduce a therapy which necessitated frequent intramuscular injections of a drug.

After gestagenic hormones became available which are active progestationally when administered orally, and after the disadvantages above referred to had been overcome, supplemental clinical tests have verified the ability of certain of such orally usable drugs to relieve migraine attacks, but the primary hormonal effects of these drugs have been a contraindication for their general clinical use.

Thus, as is well known, all gestagenic hormones will of course interfere with the menstrual cycle, which in itself is a serious obstacle to their general use, and furthermore, most oral gestagenic hormones possess androgenic properties to so pronounced a degree that a prophylactic with daily administration of sufficient doses, for example in migraine therapy, to women would bring harmful side-effects in its train, such as growth of beard, change of the vocal pitch, and hirsutism, a fact which also becomes apparent when using Nor-testosterone derivatives.

It has now been discovered that 6α-trifluoromethyl-17α-acetoxyprogesterone and certain other 17-esters of this steroid compound are particularly valuable for the treatment of patients suffering from migraine or certain forms of headache, owing to the fact that the hormonal effects known from treatment of migraine patients with other progestationally active compounds are absent in the case of this compound.

Biopsy examinations of women suffering from amenorrhea and clinically treated in a known manner with an adequate oestrogen, and subsequently with a progestationally active compound, have established that when progesterone or 6α-methyl-17α-acetoxyprogesterone in the said therapy were substituted by 6α-trifluoromethyl-17α-acetoxyprogesterone in doses from 10 mg. to 50 mg. daily, the ability of the known progestationally effective steroids to induce the secretion stage of the endometrium was absent, whereas the oestrone-induced proliferation stage of the endometrium proceeded, even after administration of up to 900 mg. of the compound in the period of treatment.

This is in fact surprising, as animal tests previously performed have demonstrated gestagenic properties of 6α-trifluoromethyl-17α-acetoxyprogesterone, and as the compound according to the literature is successfully used as an active component in a preparation for the treatment of premenstrual tension, containing in addition to the compound itself a diuretic and a sedative.

Additional clinical investigations carried out in connection with the present invention have on the other hand shown that a favorable prevention of migraine attack is obtained if 6α-trifluoromethyl-17α-acetoxyprogesterone is administered orally in doses of from 5 mg. to 50 mg. daily. During such treatment of women as well as of men no hormonal side effects were observed indicating a favorable selective action.

It is assumed that the effect can be explained by the influence of the compound on the muscles of the wall of the carotid artery.

The composition according to the present invention contains as the active component a member of the group selected from 17-esters of 6α-trifluoromethyl-17α-hydroxyprogesterone which are represented by the following formula:

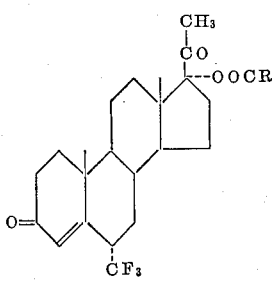

in which R is hydrogen, or a lower saturated alkyl group, including cycloaliphatic groups, containing less than 7 carbon atoms, and atoxic phamaceutically acceptable carriers and auxiliary agents.

The lower alkyl group may be methyl, ethyl, propyl, butyl, or pentyl, for example; or any of the branched chain alkyl groups such as isopropyl, isobutyl, tertiary butyl; or cycloaliphatic groups such as cyclopentyl and cyclohexyl; always, however, below a limit of 7 carbon atoms in the group.

The ratio of the therapeutic active agent to the carrier substances and auxiliary agents can be within the range from about 1:2500 to 1:2.5, depending on the mode of application. Thus, for instance, the said ratio may appropriately be from 1:50 to 1:2.5 when the composition is applied in the form of tablets, whereas a smaller ratio is preferred when the composition is given as suppositories or mixtures.

The composition in question can either be worked up to pharmaceutical forms of presentation as for example tablets, pills, dragées, or suppositories, or the composition can be filled into medical containers, such as vials or ampules, or as far as mixtures are concerned, be filled into bottles or tubes or the like containers.

Pharmaceutical organic or inorganic solid or liquid carriers suitable for enteral or parenteral administration can be used for the preparation of the composition: water, gelatine, lactose, starch, magnesium stearate, talc, vegetable and animal oils and fats, benzyl alcohol, gum, polyalkylene glycol, petroleum jelly, cocoa butter, lanolin, or other known carriers for medicaments are all of them suitable as carriers, while stabilizing agents, wetting or emulsifying agents, salts for varying the osmotic pressure, or buffers for securing an adequate pH value of the composition, can be used as auxiliary agents.

The drug may be administered in a variety of forms. The preferred form of administration in the treatment of migraine is the peroral daily taking of tablets, preferably containing the acetate of 6α-trifluoromethyl-17α-hydroxyprogesterone. However, injection may also be applied in which case the steroid compound is dissolved, e.g., in an oil, or, in the form of crystals of an adequate size, suspended in a suitable oily or aqueous carrier with the purpose of obtaining a prolonged effect, and particularly with the purpose of obtaining a constant level of concentration of the drug in the body fluids for an adequate length of time.

Administration in the form of suppositories is also applicable.

One of the advantages of the present invention is that it provides a dosage unit which can be administered in such a way that the desired activity is achieved without simultaneous secondary effects.

It has been found that the 17-esters of 6α-trifluoromethyl-17α-acetoxyprogesterone aforesaid can conveniently be administered in dosage units containing not less than ¼ mg. and preferably from 5 to 50 mg. when perorally used in the treatment of migraine.

By the term dosage unit is meant a unitary dose, that is, a single dose that is capable of being administered to the patient, and which can be readily handled and packed, and remain a physically stable unit dose.

If the composition is to be injected, that is, in order to obtain a prolonged effect, a sealed ampule, a vial, or a container may be provided containing a parenterally acceptable aqueous or oily injectable solution of the active material as a dosage unit, containing not less than 5 mg. and preferably from 25 to 100 mg. of one of the 17-esters of the 6α-trifluoromethyl-17α-hydroxyprogesterone aforesaid. In treatments with injection preparations of the above kind one weekly intramuscular injection, or injections at even longer intervals, will be suitable, always depending, however, on the patient and his condition.

If it is desirable to administer the 17-ester of 6α-trifluoromethyl-17α-acetoxyprogesterone in the form of a spray dose the steroid esters in question is conveniently administered in a dose of from 0.025 mg. to 0.250 mg. limits, however, which shall not be considered a limitation of the present invention.

For oral administration the unit dose will conveniently consist of not less than ¼ mg. and preferably from 5 to 50 mg. of the compound in the form of tablets which may be administered at suitable intervals, for example once or twice per day.

The invention will now be illustrated by the following example:

EXAMPLE

Tablets containing 5 mg. of the active compound, and of the following composition, were prepared as described below:

| | Mg. |
|---|---|
| 6α-trifluoromethyl-17α-acetoxyprogesterone | 5 |
| Lactose | 69 |
| Starch | 57 |
| Gelatine | 2 |
| Talc | 9 |

The calculated amount of active compound, lactose, and starch, were mixed, granulated with a solution of gelatine in water and dried. After sifting the calculated amount of talc is added, the tablets are made by means of a 17 mm. punching die which provides tablets weighing 142 mg. each corresponding to 5 mg. of the active compound per tablet.

In carrying out the process of the invention and in utilizing the dosage unit of the invention, the tablets were tested on patients comprising 31 women of or past the fertile age, and 10 men who had been subjected to medical observation for periods of some length prior to the treatment with 6α-trifluoromethyl-17α-acetoxyprogesterone. The patients were treated first with 5 mg. per day of 6α-trifluoromethyl-17α-acetoxyprogesterone administered perorally. The result of the treatment appears from the table below:

| Number of patients | Sex | Number of migraine attacks per month on an average | |
|---|---|---|---|
| | | Before treatment | During treatment |
| 12 | Female | 16 | 2 |
| 19 | do | 3 | 1 |
| 5 | Male | 19 | 2 |
| 5 | do | 5 | 1 |

During a subsequent period the treatment was continued with an increased daily dose of the drug, that is, 10 mg. to 15 mg. per day, resulting in an increased effect which with a daily dose of 15 mg. caused complete absence of migraine attacks in the patients under test. No serious secondary effects were demonstrated either in men or women. In two of the 31 women, minor, and from a clinical point of view unimportant, variations in the menstrual cycle were noticed.

Another 79 patients suffering from migraine were treated with a daily dose of 10 mg. of 6α-trifluoromethyl-17α-acetoxyprogesterone in the form of tablets. On an average the treatment stretched over 4 months in which period the effect manifested itself by an average fall in the frequency of the migraine attacks from 10 to 1 per month in 70% of the patients, a result which compared very favourably with the relief obtained after treatment of migraine patients with conventional drugs for this disease.

During the treatment no secondary effects were demonstrated except that 6 of the women had had an insignificantly shorter or slightly longer menstrual cycle. In one case the cycle was shortened to two weeks but the cycle became normal again during the remaining part of the treatment.

Generally, the patients felt better during the treatment.

Within the same group of patients a double blind placebo test was performed on 7 patients of which 4, having taken the drug, all of them showed a marked improvement, whereas the 3 patients who had taken placebo one and all declared that the treatment had been ineffective.

In view of my invention and disclosure, variations and modifications to meet individual whim or particular need will doubtless become evident to others skilled in the art, to obtain all or part of the benefits of my invention without copying the process and composition shown, and I, therefore, claim all such insofar as they fall within the reasonable spirit and scope of my claims.

Having thus described my invention what I claim as new and desire to secure by Letters Patent is:

1. The method of treating migraine in men and women, which comprises administering into the body from 5 to 50 mg. per day of a member of the group selected from 17-esters of 6α-trifluoromethyl-17α-hydroxyprogesterone having the following formula:

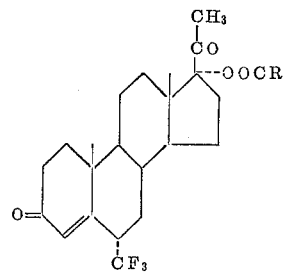

in which R is a group of the class consisting of hydrogen and non-cyclic lower alkyl containing less than 7 carbon atoms.

2. A method of claim 1, which comprises administering the member of the group by mouth.

3. A method of claim 1, which comprises administering a member of the group parenterally.

4. A method of treating migraine in men and women, which comprises administering to the body from ¼ to 100 mg. per day of 6α-trifluoromethyl-17α-acetoxyprogesterone.

5. A method of claim 4, which comprises administering said 6α-trifluoromethyl-17α-acetoxyprogesterone by mouth in amount of from 5 to 100 mg. per day.

6. A method of claim 4, which comprises administering said 6α-trifluoromethyl-17α-acetoxyprogesterone parenterally.

References Cited

FOREIGN PATENTS 905,694   9/1962   Great Britain.

OTHER REFERENCES

Dosal et al.: Current List of Medical Literature, vol. 24, No. 4, p. 462, item 30536 (October 1953) and vol. 24, Cumulated Subject and Author Indexes, p. 405; abstracting Clinica Y Laboratorio (Zaragoza), vol. 55:322, pp. 22–26, January 1963.

ALBERT T. MYERS, *Primary Examiner.*

LEROY B. RANDALL, *Assistant Examiner.*